United States Patent [19]

Gibert

[11] Patent Number: 5,335,891
[45] Date of Patent: Aug. 9, 1994

[54] STABILIZATION STRUT FORMING A SUPPORTING LEG FOR A TRANSPORTABLE STRUCTURE, SUCH AS AN EQUIPMENT SHELTER, FOR EXAMPLE

[75] Inventor: Pierre Gibert, Tarbes, France
[73] Assignee: Giat Industries, Versailles, France
[21] Appl. No.: 994,112
[22] Filed: Dec. 21, 1992
[51] Int. Cl.⁵ .............................................. B60S 9/02
[52] U.S. Cl. ................... 248/354.1; 248/351; 248/354.3; 280/765.1
[58] Field of Search .................. 248/351, 354.1, 354.3, 248/685, 688, 682, 188.5, 188.8; 280/763.1, 764.1, 765.1, 766.1

[56] References Cited

U.S. PATENT DOCUMENTS

| | | |
|---|---|---|
| 2,519,364 | 8/1950 | Fredholm ..................... 248/354.3 X |
| 2,990,194 | 6/1961 | Abolins . |
| 3,024,042 | 3/1962 | Abolins . |
| 3,262,582 | 7/1966 | Pitman et al. ..................... 280/765.1 |
| 3,442,531 | 5/1969 | Rutledge ..................... 280/765.1 |
| 3,743,108 | 7/1973 | Visser ..................... 280/765.1 X |
| 3,783,960 | 1/1974 | Feliz . |
| 3,857,582 | 12/1974 | Hartog ..................... 248/354.1 X |
| 3,909,040 | 9/1975 | Visser ..................... 280/765.1 |

FOREIGN PATENT DOCUMENTS

| | | |
|---|---|---|
| 27616 | 3/1964 | Fed. Rep. of Germany ... 280/765.1 |
| 1035955 | 7/1966 | United Kingdom ............ 280/765.1 |

OTHER PUBLICATIONS

Patent Abstracts of Japan, vol. 3, No. 140 (M-81) Nov. 20, 1979, JP-A-54 118 024 (Aishin Seiki) Sep. 13, 1979.

Primary Examiner—David A. Scherbel
Assistant Examiner—Derek J. Berger
Attorney, Agent, or Firm—Bell, Seltzer, Park & Gibson

[57] ABSTRACT

The stabilization strut comprises at least two coaxial tubular elements (respectively an upper element and a lower element) which are telescopically assembled together, together with an extension system for moving the lower element axially towards or away from the upper element. The upper element is pivotally mounted about a pin carried by the structure, and pivoting movement of the strut is controlled by a pivot system hinged to the structure about a pin and actuated by the extension system for the strut. The invention is applicable to stabilizing equipment shelters, for example.

12 Claims, 3 Drawing Sheets

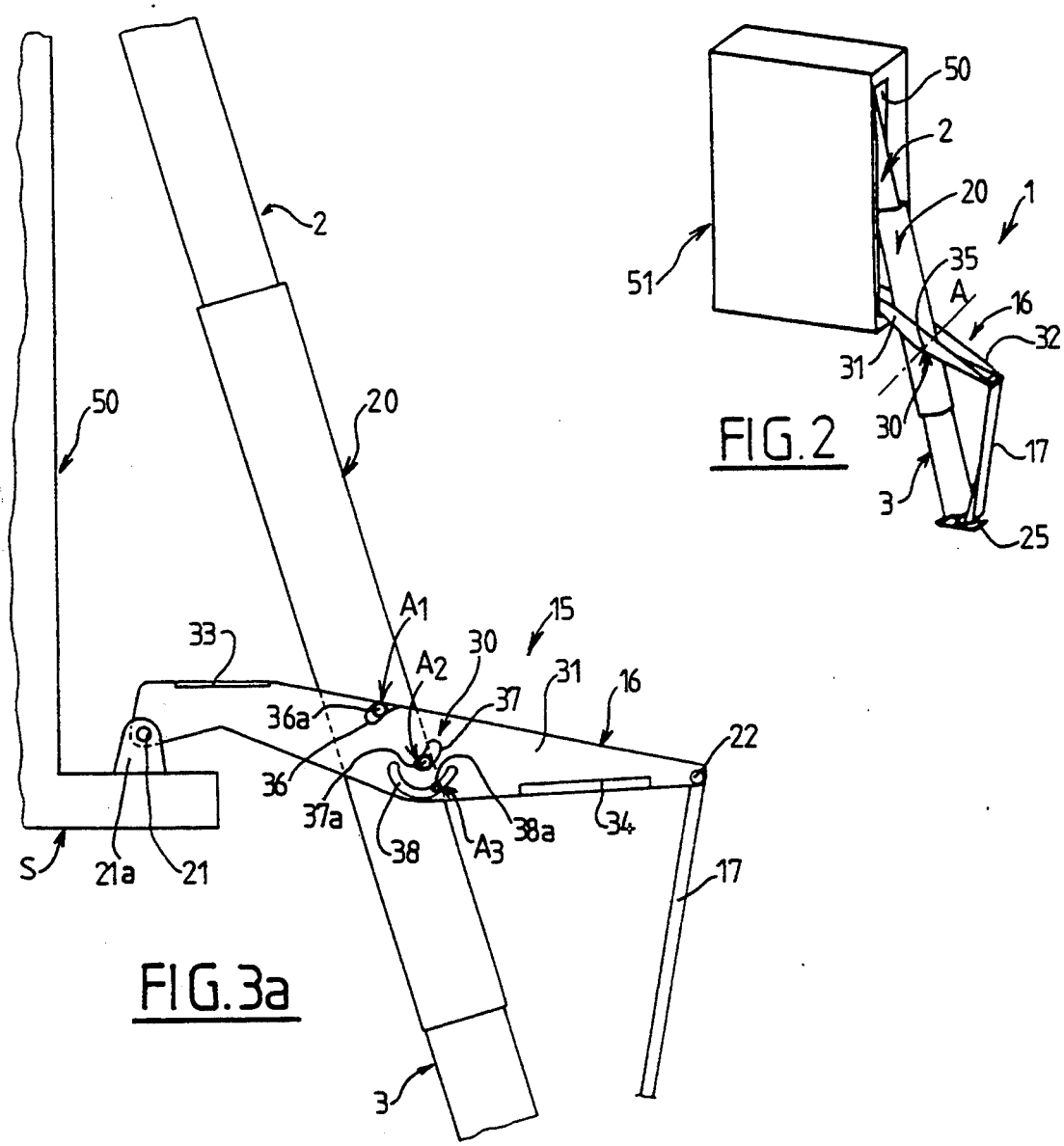
FIG. 2
FIG. 3a
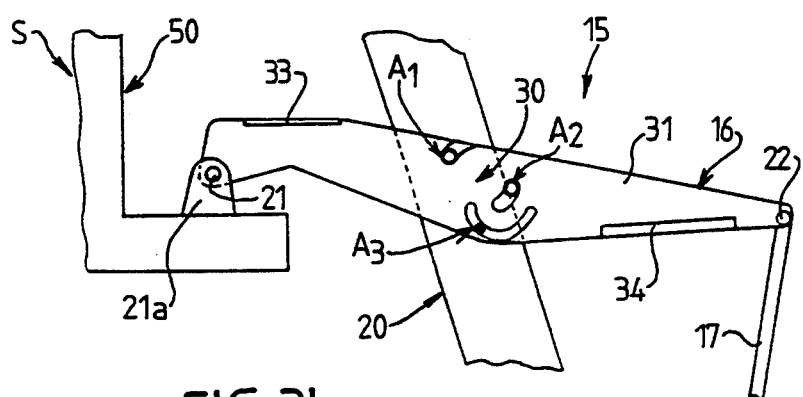
FIG. 3b

STABILIZATION STRUT FORMING A SUPPORTING LEG FOR A TRANSPORTABLE STRUCTURE, SUCH AS AN EQUIPMENT SHELTER, FOR EXAMPLE

The present invention relates to a stabilization strut forming a supporting leg for a transportable structure such as an equipment shelter, the strut being of the type comprising at least upper and lower coaxial tubular elements telescopically assembled together by an extension system for moving the two elements axially away from each other or towards each other depending on whether the strut is passing from a folded position in which one of the elements is nested in the other with both elements lying on a substantially vertical axis to an unfolded position in which the elements are moved apart from each other, or conversely is passing from the unfolded position to the folded position.

BACKGROUND OF THE INVENTION

In general, the term "equipment shelter" should be understood as designating a transportable enclosure which houses equipment on which a technical team works, with the particular equipment naturally being a function of the intended application. Such equipment shelters are transported by heavy goods vehicles fitted with platforms. On arrival at the working site, the equipment shelter is stabilized on the ground using one of the following three solutions.

In a first solution, the equipment shelter is merely placed on the ground by hoisting means which preferably form a part of the heavy goods vehicle, and it is stabilized on the ground, for example, either by legs of adjustable length carried by the equipment shelter, or else by wedging with chocks. In general, this first solution has the merit of being simple, but it necessarily gives rise to stabilization that is approximate, in particular with reference to the position of the equipment shelter relative to the horizontal.

In a second solution, the equipment shelter remains installed on the platform of the transporting heavy goods vehicle and it is stabilized relative to the ground indirectly by means of jacks or other actuators fitted to the heavy goods vehicle.

In a third solution, the equipment shelter also remains in place on the platform of the transporting heavy goods vehicle, but it is stabilized relative to the ground directly by means of hinged arms or struts carried by the equipment shelter and that bear directly on the ground.

In certain applications, the equipment carried in an equipment shelter must be thoroughly stabilized relative to the ground in order to be capable of operating properly. This applies in particular to mobile radar installations that are housed in transportable equipment shelters which are surmounted by antennas. For such installations, it turns out that the third above-mentioned technical solution is the solution used most frequently, however that solution is not without its drawbacks.

In general, the stabilization struts used comprise actuators that can be retracted by means of deformable parallelograms and means for locking the actuators in position, thus giving rise to complex structures that are quite bulky, relatively heavy, and having numerous hinge axes that make it difficult to obtain good stiffness.

The object of the invention is to design stabilization struts capable of mitigating the above-mentioned drawbacks by means of a hinge mechanism that is simpler and more reliable for extending and for folding the struts, while also providing other advantages.

SUMMARY OF THE INVENTION

To this end, the invention provides a stabilization strut of the above-specified type, wherein the strut is pivoted on the equipment shelter, with the pivoting motion of the strut being controlled by a pivot system hinged to the equipment shelter and actuated by the deployment system of the strut.

In a preferred embodiment of the invention, the pivot system of the strut comprises a lever pivoted at one end on the equipment shelter, a connecting rod whose two ends are hinged respectively to the other end of the lever and to the free end of the lower element, and an intermediate or third tubular element hinged to the lever and slidably mounted on the upper and lower elements of the strut.

Thus, with such an assembly, when the lower tubular element of the strut moves relative to the upper tubular element under drive from the extension system controlled by a drive member, such as an electric motor, for example, the lever is pivoted by the displacement of the connecting rod connected to the lower tubular element, and simultaneously the strut is pivoted by the displacement of the intermediate tubular element connected to the lever.

The upper tubular element of the strut is pivotally connected to the equipment shelter about a first horizontal axis, and the lever of the pivot system is pivotally connected to the equipment shelter about a second horizontal axis situated at a lower level relative to the ground than the first axis, said axes lying substantially in the same vertical plane, such that when the strut is in its folded position, the upper and lower tubular elements are nested in one another inside the third tubular element which is advantageously situated in the same vertical plane as the two above-mentioned axes, the length of said intermediate element being slightly shorter than the distance between the two hinge axes so that the strut takes up a vertical position between them.

Advantageously, when in its folded position, the strut is received in an outwardly-open housing provided in the equipment shelter, the end walls of said housing respectively supporting two supporting forks for supporting the two hinge axes of the strut, for example.

Thus, the pivoting movement of the strut as initiated simultaneously with the displacement of the lower tubular element at the beginning of the strut-extending stage, serves to disengage the strut from its housing.

In its unfolded position, the strut bears against the ground via a shoe which is hinged to the end of the lower tubular element, the strut sloping relative to the vertical at an angle of about 10°.

In one embodiment, the strut extension system comprises a screw received inside the upper element. When driven in rotation, said screw moves along the tapped inside wall of the upper element, and it is extended by a threaded rod having screw engagement with a nut secured to the lower element.

According to yet another feature of the invention, the strut is fitted with means enabling a hinged shoe at the free end of the lower tubular element to be displaced substantially vertically at the end of the extension stroke so as to avoid scraping over the ground. These means are constituted by an appropriate hinge provided between the pivot lever and the third tubular element, as described in detail below.

A stabilization strut of the invention has only two connection points with the equipment shelter, it occupies a minimum amount of space once folded into its housing, and it uses an extension system that is simple and that can be controlled automatically without taking manual action.

A transportable equipment shelter for a mobile radar installation is advantageously stabilized on the ground by means of four struts of the invention.

BRIEF DESCRIPTION OF THE DRAWINGS

An embodiment of the invention is described by way of example with reference to the accompanying drawings, in which:

FIG. 2 is a perspective view on a smaller scale showing the strut in its unfolded position;

FIGS. 3a and 3b are diagrammatic fragmentary section views of the strut to show the characteristics of its pivot system.

DETAILED DESCRIPTION

Figure 1:
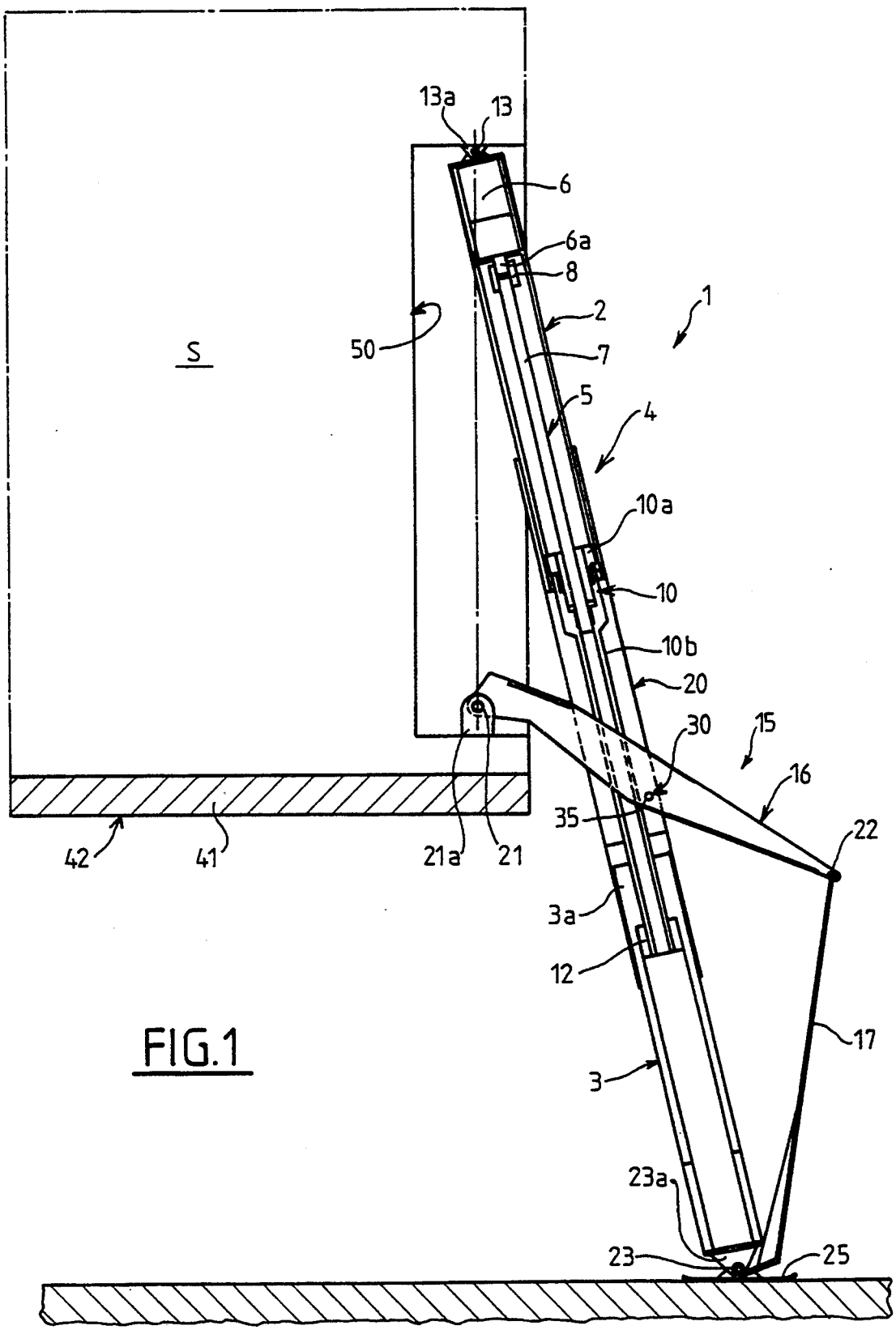
FIG. 1 is a diagrammatic section view of a stabilization strut of the invention in its extended or in-use position.

With reference to FIG. 1, a stabilization strut 1 of the invention comprises at least two coaxial tubular elements, respectively an upper element 2 and a lower element 3 which are assembled together telescopically, together with an extension system 4 for moving these two elements 2 and 3 apart from or towards each other in an axial direction depending on whether the strut 1 is being unfolded or is being folded back up.

In the example described herein, the extension system 4 for the strut 1 comprises a telescopic link device 5 of mechanical type mounted between the upper and lower elements 2 and 3 and driven by a motor 6 housed inside the upper element 2, towards the free end thereof. The link device 5 comprises a drive shaft 7 housed inside the upper element 2 and having one end constrained to rotate with the outlet shaft 6a of the motor 6 by a conventional coupling 8. The other end of the shaft 7 is engaged in the head 10a of a hollow screw 10 which is constrained to rotate with the shaft 7, e.g. by fluting, thereby enabling the shaft to slide inside the hollow shank 10b of the screw 10. The head 10a of the screw 10 has an outside thread for engaging in the upper element 2 whose inside wall is tapped. The link device 5 also has a nut 12 screwed onto the shank 10b of the screw 10 which has an outside thread. Said nut 12 is prevented from rotating at the bottom of a hollow tube 3a force-fitted inside the lower element 3 so as to enable said element 3 to move axially relative to the upper element 2 when the screw 10 is rotated by the shaft 7. It should be observed that the threads on the head 10a and on the shank 10b of the screw 10 are at the same pitch but are oppositely handed.

In general, the stabilization strut 1 is mounted via its upper element 2 to a structure S so as to pivot in a vertical plane, where the structure may be an equipment shelter with the strut forming a supporting leg for the structure. To do this, the upper element 2 of the strut 1 is hinged about a horizontal pin 13 carried by a fork 13a secured to the equipment shelter S.

The pivoting motion of the strut 1 about the pin 13 is controlled by a pivot device 15 which, in the example described herein, comprises a rocking lever 16, a connecting rod 17, and an intermediate or third tubular element 20. The pivot device is actuated by the extension system 4.

More precisely, the lever 16 is pivotally mounted at one end about a horizontal pin 21 supported by a fork 21a fixed to the equipment shelter S. The hinge pin 21 is situated at a lower level relative to the ground than the level of the hinge pin 13 between the upper element 2 of the strut 1 and the equipment shelter S. These two pins 13 and 21 preferably lie in the same vertical plane, and they constitute the two link elements between the strut 1 and the equipment shelter S.

The other end of the lever 16 is hinged about a pin 22 to one end of the connecting rod 17 whose other end is hinged to the free end of the lower element 3 by a pin 23 carried by a fork 23a fixed to the lower element 3. A shoe 25 is hinged on the pin 23 and constitutes ground support means for the strut 1. The intermediate tubular element 20 is slidably mounted on the upper and lower tubular elements 2 and 3, and it is hinged to the lever 16, substantially in the middle thereof, by means of a hinge device 30.

In the present example, as can be seen in FIGS. 1 and 2, the lever 16 is made up of two parallel arms 31 and 32 which are interconnected by end spacers 33 and 34, the strut 1 passing through the lever 16 via the opening defined between its arms and its spacers.

The hinge 30 between the lever 16 and the intermediate tubular element 20 is constituted by two fingers 35 in axial alignment on an axis A, for example. These two fingers 35 are supported by the intermediate element 20 and they engage in respective ones of the two arms 31 and 32 of the lever 16.

In a preferred embodiment s shown in FIGS. 3a and 3b, the hinge 30 between the lever 16 and the intermediate element 20 includes three parallel pins A1, A2, and A3 respectively associated with three sets of slots 36, 37, and 38. More precisely, the pin A1 comprises two fingers 36a in axial alignment which are respectively received in two facing slots 36 provided in the two arms 31 and 32 of the lever 16. The two slots 36 are arcuate having a radius of curvature r, and they open out at one end to the top edges of the two arms 31 and 32. The pins A2 and A3 associated with the slots 37 and 38 are disposed similarly. The two slots 37 associated with the two axially aligned fingers 37a defining the pin A2 are situated in the central portion of the lever 16 and they have the same radius of curvature r as the slots 36. The slots 36 and 37 associated with each of the arms 31 and 32 of the lever 16 are, overall, diametrically opposite on a circle of radius r. The two slots 38 respectively associated with the two axially aligned fingers 38a defining the pin A3, are situated beneath the slots 37 and they have a radius of curvature r1. In general, the hinge 30 makes it possible to avoid the shoe 25 skidding on the ground, as explained below.

The stabilization strut 1 is designed to act as a supporting leg for a transportable equipment shelter S which is generally in the form of a rectangular block of dimensions enabling it to be supported and stabilized on four stabilization struts 1 of the invention disposed in respective corners of the equipment shelter.

The bottom face of the equipment shelter S rests on the platform 41 of a transport vehicle 42, with each of the struts 1 being in its folded position. In this position, the length of the strut 1 corresponds approximately to the length of the intermediate element 20 which contains the upper and lower elements 2 and 3 that are nested in one another.

In general, when in its folded position, the strut is vertical and it is advantageously received in an outwardly open housing 50 of the equipment shelter S. The height of the housing 50 is slightly greater than the length of the intermediate element 20. The two forks 13a and 21a supporting the two hinge pins 13 and 21 of the strut are fixed to respective ones of the two end walls of the housing 50.

Figure 4A:
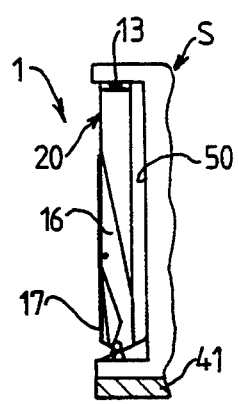
FIGS. 4a to 4f are diagrams showing various different stages while a stabilization strut of the invention is being extended.
Figure 4B:
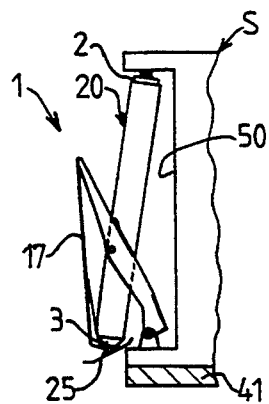

In this storage position, the component parts of the telescopic link device 5 are in the following positions: the head 10a is situated adjacent to the motor 6; the shaft 7 is received inside the shank 10b; the nut 8 is situated in the vicinity of the head 10a of the screw 10; and the lever 16 extends parallel to the intermediate element 20. This storage position is shown diagrammatically in FIG. 4a.

Once the vehicle 42 has reached the site where the equipment shelter S is to be put into operation, the four stabilization legs 1 are unfolded simultaneously by causing the associated set of motors 6 to operate in a given direction of rotation.

The way in which a single stabilization strut 1 is unfolded is described below with reference to FIGS. 4b to 4f.

In general terms, the strut 1 is unfolded in three stages.

In a first stage, it is necessary to disengage the strut 1 from its housing 50 so that it can be extended, with the lower element 3 moving progressively away from the upper element 2.

To disengage the strut 1 from its housing 50, it suffices to pivot it about the hinge pin 13 connecting the upper element 2 to the equipment shelter S. This pivoting movement of the strut 1 is obtained by pivoting the lever 16 which is hinged to the intermediate element 20 of the strut 1. More precisely, the motor 6 is caused to rotate the shaft 7 by means of its own outlet shaft 6a so as to rotate the screw 10 which simultaneously screw its head 10a into the inside of the upper element 2 and its shank 10b into the nut 12. The motor 6 is rotated in a direction such that the screw 10 moves down inside the upper element 2 causing the lower element 3 to slide with it and thus extend progressively away from the upper element 2. Nevertheless, as soon as the lower element 3 begins to slide, it causes the lever 16 to pivot about the hinge axis 21 carried by the equipment shelter S by means of the connecting rod 17. Given that the intermediate element 20 of the strut 1 is hinged to the lever 16, the strut 1 pivots about its hinge pin 13 and takes up an inclined position as shown diagrammatically in FIG. 4b.

Figure 4C:
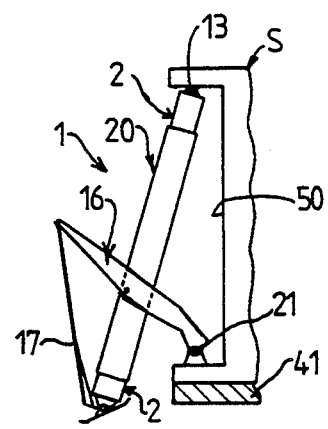
Figure 4D:
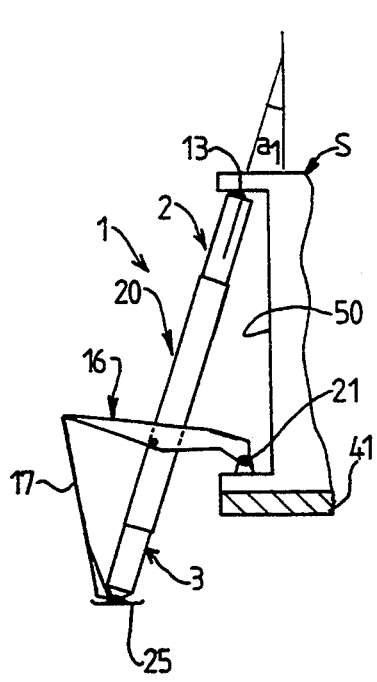
Figure 4E:
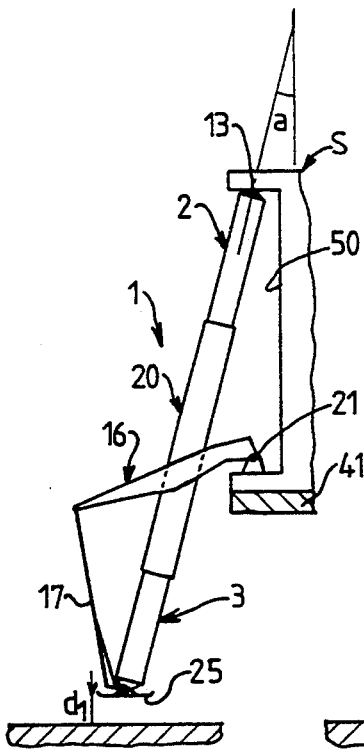
Figure 4F:
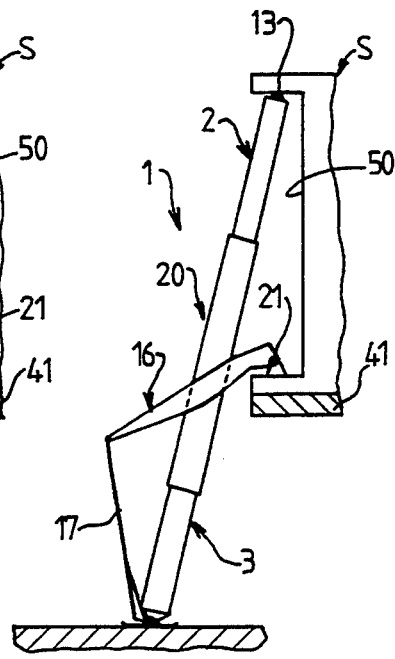

During the second stage of extending the strut 1, as shown diagrammatically in FIGS. 4c and 4d, the strut 1 continues to extend under the combined action of four different motions all driven by the same motor 6. The lower element 3 moves axially relative to the upper element 2; the lever 16 pivots; the intermediate element 20 slides; and the strut 1 pivots. At the end of this second extension stage, as can be seen in FIG. 4d, the strut 1 has pivoted through an angle a relative to its initial vertical position inside its housing 50, and the shoe 50 at the free end of the lower element 3 is situated at a distance d1 from the ground.

Consideration is now given to the positions of the three hinge pins A1, A2, and A3 between the lever 16 and the intermediate element 20 during these two extension stages. While the strut 1 is in its folded position, and with reference to FIG. 3a:

the pin A1 is not situated at the ends of the associated slots 36 and provides no action;

the pin A2 is at one of the ends of the associated slots 37 forming a pivot axis during the first two above-mentioned extension stages; and the pin A3 moves along the associated slots 38 so as to force the lever 16 to pivot about the pin A2.

Before the end of the second extension stage of the strut 1 (FIG. 4d), it should be observed that the angle of inclination of the strut 1 relative to the vertical passes through a maximum value a1.

During the third extension stage of the strut 1, the shoe 35 travels the distance d1 separating it from the ground, and it does this by following a path that is substantially vertical. This path is obtained by changing the pivot axis of the lever 16 which is no longer constituted by the pin A2, but by the pin A1. FIG. 3b shows the positions of the pins A1, A2, and A3 during the third extension stage of the strut 1, with the pin A3 forcing the lever 16 to pivot about the pin A1.

Thus, it is possible to use the hinge device 30 to cause a substantially constant separation to be obtained between the shoes 25 at the end of the strut-extending stroke. Naturally, this advantage can only be obtained providing the struts 1 extend over sufficient length.

At the end of the third extension stage (FIG. 4f) the shoe 25 bears against the ground and the motors 6 in all four struts 1 are stopped, thereby automatically ensuring that the struts are held in place without necessarily requiring the use of additional locking means.

Naturally, the extended length of each of the struts 1 can subsequently be individually adjusted to accommodate unevenness of the ground.

In general, the equipment shelter S may remain supported by the platform 41 of the transporter vehicle 42, however it may alternatively be self-contained so as to release the transporter vehicle 42. To make this possible, it suffices to switch on the motors 6 of the struts 1 additionally so as to raise the equipment shelter S off the platform 1 through a height that is sufficient to enable the vehicle to move away.

To refold each of the struts 1, it suffices to cause the associated motor 6 to rotate in the opposite direction, thereby returning each strut into its housing 50.

On average, stabilization struts of the invention enable equipment shelters weighing several tons to be stabilized and supported at heights of 1 to 2 meters above the ground.

In the embodiment described above, each strut 1 in the folded position is advantageously received in a housing 50 provided in the equipment shelter S. As shown diagrammatically in FIG. 2, the housing 50 may form a portion of a self-contained support 51 which is then fixed to the equipment housing S.

The invention is naturally not limited in any way to this particular embodiment, and it extends to any technical means that are equivalent to those described above and given purely by way of example. In particular, the extension system may use a hydraulic actuator that is telescopic, comprising a plurality of rods, for example, or else it may use a ball or roller screw actuator. Finally, the hinge means 30 provided between the lever 16 and the intermediate element 20 may be displaced to the hinge axis 21 between the lever 16 and the equipment shelter S.

I claim:

1. A stabilization strut for forming a supporting leg for a transportable structure, said strut comprising upper and lower coaxial tubular elements, said upper element having an upper end adapted to be connected to said structure, and said lower element having a lower free end for supporting the transportable structure, an extension system telescopically assembling said upper and lower tubular elements together for movement axially towards or away from each other between a folded position in which one of the elements is nested in the other and an unfolded position in which the elements are moved axially apart from each other, and a pivot system carried by said tubular elements and actuated by deployment of the strut, said pivot system comprising a lever having one end adapted to be connected to the transportable structure, a connecting rod having one end hingedly connected to the opposite end of said lever and having its opposite end connected to the free end of said lower element, and an intermediate tubular element slidably mounted on said upper and lower elements and hingedly connected to said lever.

2. A strut according to claim 1, wherein the extension system includes a control member for axially displacing the lower element relative to the upper element, displacement of the lower element simultaneously entraining pivoting of the lever, pivoting of the strut, and sliding of the intermediate element.

3. A strut according to claim 2, wherein the extension system is constituted by a telescopic link device mounted between the upper and lower elements, and actuated by a motor housed inside the upper element.

4. A strut according to claim 3, wherein the telescopic link device comprises a drive shaft housed inside the upper element and having one end constrained to rotate with the outlet shaft of the motor, the other end of the shaft engaging in the head of a hollow screw which is constrained to rotate with the shaft, said shaft being capable of sliding in the hollow shank of the screw, the head having an outside thread screwing into the tapped inside wall of the upper element, and the hollow shank having an outside thread screwing into a nut that is prevented from rotating inside the lower element.

5. A strut according to claim 4, wherein the screw is of the roller or ball screw type.

6. A strut according to claim 1, including a first horizontal pin cooperating with the upper end of said upper element for pivotally mounting the upper element to the structure, and a second horizontal pin cooperating with said lever for hingedly connecting said lever to the structure, said second horizontal pin situated at a level that is lower than that of the first pin relative to the ground, said two pins being substantially in the same vertical plane.

7. A strut according to claim 6, wherein in the folded position of the strut the upper and lower elements are nested one in the other inside the intermediate element which is of a length that is slightly shorter than the distance between the two hinge pins between the strut and the equipment shelter.

8. A strut according to claim 7, wherein the folded position, the length of the strut corresponds to the length of the intermediate element which is situated in substantially the same vertical plane as the hinge pins between the strut and the equipment shelter.

9. A strut according to claim 1, including a shoe hingedly connected to the free end of said lower element and means associated with the lever so that said shoe moves downwards substantially vertically towards the end of the extension stroke of the strut.

10. A strut according to claim 9, wherein the said means associated with the lever comprises a plurality of hinge pins between the lever and the intermediate element and movable in respective slots of the lever.

11. A strut according to claim 10, wherein the said means associated with the lever comprise three hinge pins, the lever pivoting about said pins in succession with the third pin forcing the lever to pivot about the third pin and then about the first pin while the strut is being extended.

12. A strut according to claim 9, wherein the said means associated with the lever are situated at the hinge between the lever and the equipment shelter.

* * * * *